July 24, 1923.
H. HOHMANN
SEALING WAX CANDLE
Filed July 14, 1922
1,462,601
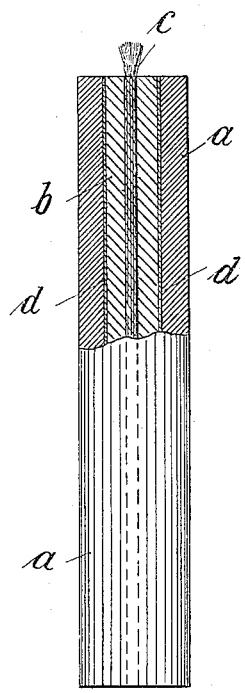

Patented July 24, 1923.

1,462,601

UNITED STATES PATENT OFFICE.

HUGO HOHMANN, OF KOPENICK, NEAR BERLIN, GERMANY.

SEALING-WAX CANDLE.

Application filed July 14, 1922. Serial No. 575,107.

*To all whom it may concern:*

Be it known that I, HUGO HOHMANN, a citizen of the German Republic, residing at Kopenick, near Berlin, Germany, have invented certain new and useful Improvements in Sealing-Wax Candles (for which I have filed application for patent in Germany 26th July, 1921), of which the following is a specification.

This invention relates to a stick of sealing wax in which a candle with wick is embedded. This candle which gives a bright flame is coated upon its outer surface with a substance which does not melt easily and only at high temperature but is combustible and impermeable to air.

In the sticks of sealing wax with a wick impregnated with wax, stearin, paraffin, hard alcohol or similar substances, the impregnating substances melt at the moulding owing to the hot temperature of the sealing wax wherefrom results the inconvenience that the impregnating substances admix with the sealing wax and defile the same so that the flame of the wick as soon as it gets at the sealing wax extinguishes frequently and the point at which the wick burns gets charred.

This invention has for its object to obviate these inconveniences and to permit the continuous sealing.

In order that the invention may be clearly understood, I shall hereafter proceed to describe the same with reference to the form of construction shown by way of example, on the accompanying drawing.

$a$ is a stick of sealing wax which may be of any convenient shape and dimensions. In this stick $a$ a candle $b$ is embedded the wick $c$ of which projects slightly from the upper edge of the stick $a$. The candle $b$ consists preferably of a material adapted to produce a bright flame not giving off any soot and it is coated upon its outer surface by a layer $d$ of a not easily combustible substance impermeable to air, such as for instance zapon lake, collodion or the like. These coating substances serve to prevent the softening of the candle and to protect the same at the moulding of the stick of sealing wax as well as against the influences of the temperature.

It is obvious that the material of the candle $b$ and the sealing wax $a$ will continuously melt as soon as the wick has been lighted so that the sealing wax candle can be continuously used for sealing.

I claim:—

A sealing-wax candle consisting of a stick of sealing-wax, of a candle embedded in said stick and of a coating of said candle consisting of a substance which melts only at high temperatures.

In testimony whereof I affix my signature in presence of two witnesses.

HUGO HOHMANN.

Witnesses:
 JULIUS S. ARLT,
 E. HOLTZERIEN.